United States Patent
Lo et al.

(10) Patent No.: US 9,904,141 B2
(45) Date of Patent: Feb. 27, 2018

(54) REFLECTIVE DISPLAY DEVICE

(71) Applicant: E Ink Holdings Inc., Hsinchu (TW)

(72) Inventors: Po-Yuan Lo, Hsinchu (TW); Wei-Chen Tsai, Hsinchu (TW)

(73) Assignee: E Ink Holdings Inc., Hsinchu (TW)

(*) Notice: Subject to any disclaimer, the term of this patent is extended or adjusted under 35 U.S.C. 154(b) by 109 days.

(21) Appl. No.: 14/826,189

(22) Filed: Aug. 13, 2015

(65) Prior Publication Data
US 2016/0170281 A1 Jun. 16, 2016

(30) Foreign Application Priority Data

Dec. 10, 2014 (TW) .............................. 103143037 A

(51) Int. Cl.
G02B 26/00 (2006.01)
G02F 1/167 (2006.01)
G02F 1/1335 (2006.01)

(52) U.S. Cl.
CPC ........ *G02F 1/167* (2013.01); *G02F 1/133502* (2013.01)

(58) Field of Classification Search
CPC .............. G02F 1/167; G02F 1/133502; G02F 1/133632; G02F 1/1368; G02B 1/11; G02B 1/118; G02B 5/003; G02B 5/3033; G02B 26/026; H01L 27/146; H01L 27/14625; H01L 27/14629; H01L 27/14636; H01L 27/14683
USPC ....... 359/266, 296, 485.01, 601; 345/32, 84; 349/96, 137; 428/215, 328
See application file for complete search history.

(56) References Cited

U.S. PATENT DOCUMENTS

| | | |
|---|---|---|
| 6,456,346 B1 | 9/2002 | Arai |
| 6,650,382 B1 | 11/2003 | Sumida et al. |
| 6,686,049 B1 | 2/2004 | Nakamura et al. |
| 7,982,953 B2 | 7/2011 | Fukuda et al. |
| 8,039,065 B2 | 10/2011 | Ikeda et al. |
| 2005/0200264 A1 | 9/2005 | Kawanami et al. |
| 2007/0278922 A1 | 12/2007 | Kim |
| 2008/0160263 A1 | 7/2008 | Cho et al. |

(Continued)

FOREIGN PATENT DOCUMENTS

| | | | |
|---|---|---|---|
| JP | 2005283730 A | * | 10/2005 |
| TW | 200848775 A | | 12/2008 |
| TW | 201426150 A | | 7/2014 |

OTHER PUBLICATIONS

Corresponding Taiwanese Office Action that these art references were cited on Sep. 8, 2015.

Primary Examiner — Mustak Choudhury
(74) Attorney, Agent, or Firm — CKC & Partners Co., Ltd.

(57) ABSTRACT

A reflective display device includes an electrophoretic display (EPD) module, a supporting member, a first anti-reflective layer, and a color filter (CFA) layer. The EPD module includes an array substrate, a protective layer, and an electronic ink (e-ink) layer. The e-ink layer is between the array substrate and the protective layer. The supporting member has a first surface and a second surface opposite to the first surface. The first anti-reflective layer is located on the first surface of the supporting member and in contact with the supporting member. The thickness of the first anti-reflective layer is ¼ wavelength of a visible light. The CFA layer is between the protective layer and the second surface of the supporting member.

8 Claims, 4 Drawing Sheets

(56) References Cited

U.S. PATENT DOCUMENTS

2009/0135492 A1    5/2009  Kusuda et al.
2009/0237774 A1*   9/2009  Ito .......................... G02F 1/167
                                                    359/296
2010/0194672 A1*   8/2010  Kim ....................... G02B 5/201
                                                    345/77
2014/0071552 A1    3/2014  Uchiyama et al.

\* cited by examiner

REFLECTIVE DISPLAY DEVICE

RELATED APPLICATIONS

This application claims priority to Taiwanese Application Serial Number 103143037, filed Dec. 10, 2014, which is herein incorporated by reference.

BACKGROUND

Field of Invention

The present invention relates to a reflective display device.

Description of Related Art

In the current market of various consumer electronic products, portable electronic devices have extensively utilized reflective display devices, such as the electronic paper display device, as display screens. An electronic ink (e-ink) layer of a reflective display device is mainly made of an electrophoresis buffer and white and black charged particles that are doped in the electrophoresis buffer. The white and black charged particles are driven to move by applying a voltage to the e-ink layer, so as to present individual pixel with black, white or a gray level. The reflective display device utilizes an incident light that irradiates the e-ink layer and is reflected to human eyes by the e-ink layer to achieve the purpose of display.

In general, reflected lights of the reflective display device entering human eyes include light that is reflected by the e-ink layer and light that is reflected by other material layers. When the proportion of the light reflected by other material layers except e-ink layer is high, the proportion of the incident light entering the e-ink layer is low. As a result, the reflected light of the e-ink layer is apt to be interfered by the light that is reflected by other material layers. When the reflected light of the e-ink layer along with other reflected light enters a human's eyes, the image quality, the contrast, and the color saturation of the reflective display device are reduced, thereby affecting visual perception.

In a typical reflective display device, optical clear adhesive is often used to adhere an additional anti-reflective layer. However, the thickness of the anti-reflective layer and the thickness of the optical clear adhesive is substantial. Therefore, the light transmittance of the reflective display device is reduced, and the manufacturing cost of the reflective display device is typically increased. For example, the thickness of the anti-reflective layer is usually greater than 100 μm. Moreover, when the reflective display device has a light guide plate of a front light module, a glass having a color filter is usually adhered to an electrophoretic display module, such that the glass with the color filter is under the light guide plate. As a result, it is difficult to reduce the thickness of the entire reflective display device, and light entering the e-ink layer is decreased due to the increased layers of the reflective display device.

SUMMARY

An aspect of the present invention is to provide a reflective display device.

According to an embodiment of the present invention, a reflective display device includes an electrophoretic display module, a supporting member, a first anti-reflective layer, and a color filter layer. The electrophoretic display module includes an array substrate, a protective layer, and an electronic ink layer. The electronic ink layer is between the array substrate and the protective layer. The supporting member has a first surface and a second surface opposite to the first surface. The first anti-reflective layer is located on the first surface of the supporting member and in contact with the supporting member. The thickness of the first anti-reflective layer is ¼ of the wavelength of visible light. The color filter layer is between the protective layer and the second surface of the supporting member.

In one embodiment of the present invention, the reflective display device further includes a first adhesive layer. The first adhesive layer is between the color filter layer and the protective layer.

In one embodiment of the present invention, the reflective display device further includes a second anti-reflective layer. The second anti-reflective layer is located on the second surface of the supporting member and in contact with the supporting member.

In one embodiment of the present invention, the reflective display device further includes a second adhesive layer. The second adhesive layer is between the second anti-reflective layer and the color filter layer.

In one embodiment of the present invention, the thickness of the second anti-reflective layer is approximately in a range of 100 nm to 180 nm.

In one embodiment of the present invention, the reflective display device further includes a third anti-reflective layer. The third anti-reflective layer is located on the first anti-reflective layer, such that the first anti-reflective layer is between the third anti-reflective layer and the supporting member.

In one embodiment of the present invention, the thickness of the third anti-reflective layer is approximately in a range of 100 nm to 180 nm.

In one embodiment of the present invention, the thickness of the first anti-reflective layer is approximately in a range of 100 nm to 180 nm.

In one embodiment of the present invention, the supporting member is a glass substrate.

In one embodiment of the present invention, the supporting member is a light guide plate, and the supporting member has a light incident surface that is adjacent to the first and second surfaces. The reflective display device further includes a light source. The light source faces the light incident surface of the supporting member.

Another aspect of the present invention is to provide a manufacturing method of a reflective display device.

According to an embodiment of the present invention, a manufacturing method of a reflective display device includes the following steps. A first anti-reflective layer is formed on a first surface of a supporting member, such that the first anti-reflective layer is in contact with the supporting member. A color filter layer is formed between a protective layer of an electrophoretic display module and a second surface of the supporting member. The second surface faces away from the first surface.

In one embodiment of the present invention, forming the first anti-reflective layer on the first surface of the supporting member includes the following step. A sputtering method is performed to form the first anti-reflective layer.

In one embodiment of the present invention, the manufacturing method of the reflective display device further includes the following steps. A protection film is adhered on a surface of the first anti-reflective layer facing away from the supporting member. The supporting member is placed on a roller device. When the roller device is in a rotation state, the roller device is in contact with the protection film, thereby moving the supporting member.

In one embodiment of the present invention, the manufacturing method of the reflective display device further includes the following steps. The color filter layer is formed on the second surface of the supporting member.

In one embodiment of the present invention, the manufacturing method of the reflective display device further includes the following step. A first adhesive layer is used to adhere the supporting member that has the color filter layer to the protective layer of the electrophoretic display module.

In one embodiment of the present invention, the manufacturing method of the reflective display device further includes the following step. The protection film is torn out of the surface of the first anti-reflective layer.

In one embodiment of the present invention, the manufacturing method of the reflective display device further includes the following step. A second anti-reflective layer is formed on the second surface of the supporting member.

In one embodiment of the present invention, the manufacturing method of the reflective display device further includes the following step. A first adhesive layer is used to adhere the color filter layer to the protective layer of the electrophoretic display module.

In one embodiment of the present invention, the manufacturing method of the reflective display device further includes the following step. A second adhesive layer is used to adhere the second anti-reflective layer to the color filter layer.

In one embodiment of the present invention, the manufacturing method of the reflective display device further includes the following step. A third adhesive layer is formed on the first anti-reflective layer, such that the first anti-reflective layer is between the third adhesive layer and the supporting member.

In the aforementioned embodiments of the present invention, since the first anti-reflective layer is directly formed on the first surface of the supporting member, an optical clear adhesive of a typical reflective display device may be omitted. Moreover, the thickness of the first anti-reflective layer is ¼ wavelength of a visible light. The thickness of the first anti-reflective layer is thin, and the reflectivity for an incident light can be reduced. The reflective display device and the manufacturing method thereof may increase the proportion of the incident light that enters the electronic ink layer, such that the reflected light of the electronic ink layer is not apt to be interfered by the reflected lights of other material layers, thereby improving the image quality, the contrast, and the color saturation of the reflective display device.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
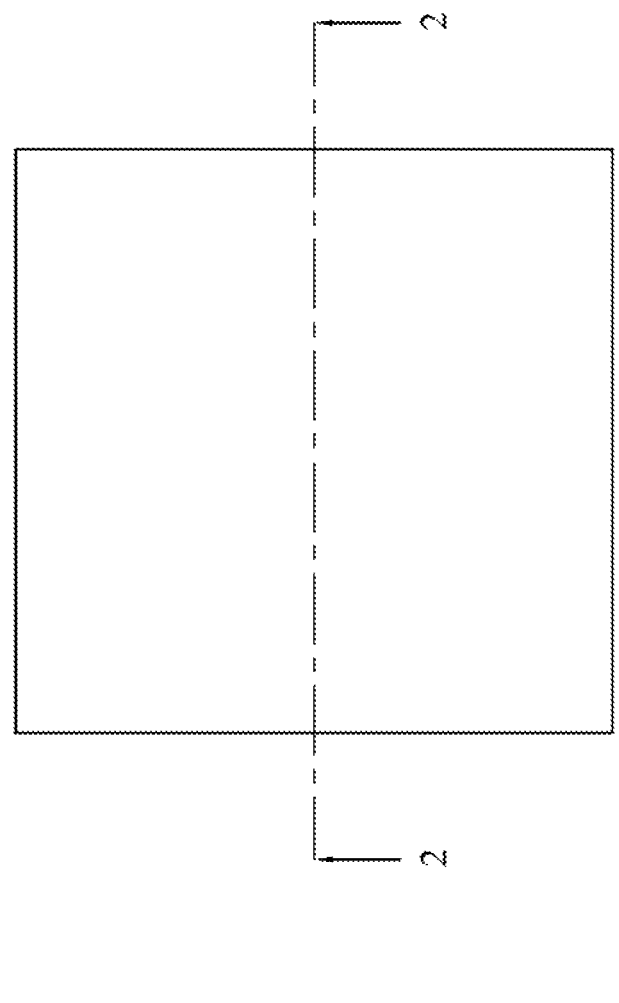
FIG. 1 is a top view of a reflective display device according to one embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
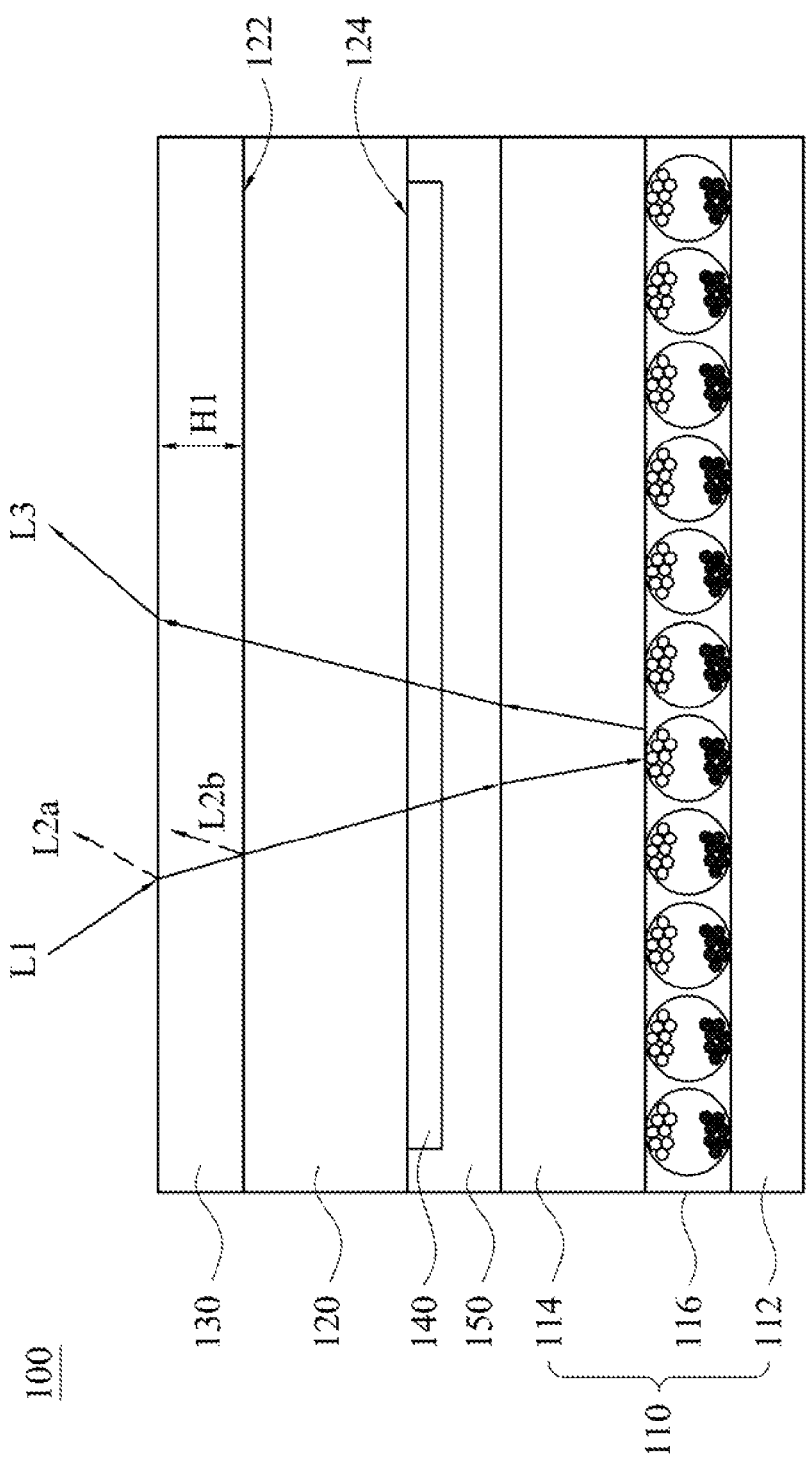
FIG. 2 is a cross-sectional view of the reflective display device taken along line 2-2 shown in FIG. 1.

FIG. 1 is a top view of a reflective display device 100 according to one embodiment of the present invention. FIG. 2 is a cross-sectional view of the reflective display device 100 taken along line 2-2 shown in FIG. 1. As shown in FIG. 1 and FIG. 2, the reflective display device 100 includes an electrophoretic display module 110, a supporting member 120, a first anti-reflective layer 130, and a color filter layer 140. The electrophoretic display module 110 includes an array substrate 112, a protective layer 114, and an electronic ink layer 116. The electronic ink layer 116 is between the array substrate 112 and the protective layer 114. The supporting member 120 has a first surface 122 and a second surface 124 that is opposite to the first surface 122. The first anti-reflective layer 130 is located on the first surface 122 of the supporting member 120, and the first anti-reflective layer 130 is directly in contact with the supporting member 120. The thickness of the first anti-reflective layer 130 is ¼ wavelength of a visible light. The color filter layer 140 is between the protective layer 114 and the second surface 124 of the supporting member 120.

In this embodiment, the protective layer 114 may be made of a material including polyethylene terephthalate (PET), and the protective layer 114 may protect the electronic ink layer 116 that is under the protective layer 114. The index of refraction n value) of the protective layer 114 may be 1.65. The color filter layer 140 may be, but is not limited to a green filter array. The color filter layer 140 may be referred to as a CFA layer, and the color filter layer 140 may be made of a material including color photoresist. The index of refraction of the color filter layer 140 may be 1.57. The supporting member 120 may be a glass substrate, but the present invention is not limited in this regard. The index of refraction of the supporting member 120 may be 1.5. The thickness H1 of the first anti-reflective layer 130 may be approximately in a range of 100 nm to 180 nm, such as 133.8 nm. The first anti-reflective layer 130 may be made of a material including silicon oxide ($SiO_2$), and the index of refraction of the first anti-reflective layer 130 may be 1.4. Designers may choose other suitable materials depending on the requirement of the index of refraction of the first anti-reflective layer 130. For example, $MgF_2$ can be used to replace $SiO_2$. The first anti-reflective layer 130 is an inorganic film, and the first anti-reflective layer 130 may prevent moisture from entering the reflective display device 100.

Since the first anti-reflective layer 130 is directly formed on the first surface 122 of the supporting member 120, an optical clear adhesive (OCA) of a typical reflective display device may be omitted. Moreover, the thickness of the first anti-reflective layer 130 is ¼ wavelength of a visible light. The thickness of the first anti-reflective layer 130 is thin, and the reflectivity for an incident light can be reduced.

For example, when an incident light L1 enters the reflective display device 100, a reflected light L2a may be formed on the surface of the first anti-reflective layer 130 facing the air, and another reflected light L2b may be formed on the surface of the first anti-reflective layer 130 facing the supporting member 120 and the first surface 122 of the supporting member 120. When the wavelength of the incident light L1 is a visible light within a medium wavelength (e.g., 530 nm-540 nm) and the thickness H1 of the first anti-reflective layer 130 is ¼ wavelength of the incident light L1 (e.g., 133.8 nm), such first anti-reflective layer 130 may reduce the reflectivity to 1.74% for the incident light L1.

Hence, the reflective display device 100 and the manufacturing method thereof of the present invention may increase the proportion of the incident light L1 that enters the electronic ink layer 116, such that the reflected light L3 of the electronic ink layer 116 is not apt to be interfered by the reflected lights of other material layers (e.g., L2a and L2b), thereby improving the image quality, the contrast, and the color saturation of the reflective display device 100. Users outside the reflective display device 100 can have good visual perception.

In this embodiment, the reflective display device 100 may further include a first adhesive layer 150. The first adhesive layer 150 is between the color filter layer 140 and the protective layer 114. The structure including the first anti-reflective layer 130, the supporting member 120, and the color filter layer 140 may be adhered to the protective layer 114 of the electrophoretic display module 110 through the first adhesive layer 150. The index of refraction of the first adhesive layer 150 may be 1.54.

In the following description, a manufacturing method of the reflective display device 100 will be described.

Figure 3:
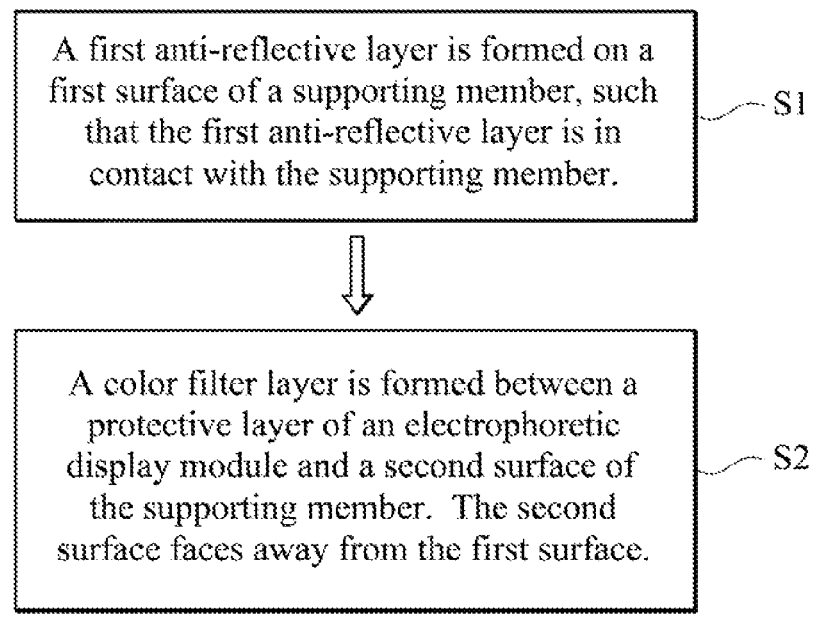
FIG. 3 is a flow chart of a manufacturing method of a reflective display device according to one embodiment of the present invention.

FIG. 3 is a flow chart of a manufacturing method of a reflective display device according to one embodiment of the present invention. The manufacturing method of the reflective display device includes the following steps. In step S1, a first anti-reflective layer is formed on a first surface of a supporting member, such that the first anti-reflective layer is in contact with the supporting member. Thereafter in step S2, a color filter layer is formed between a protective layer of an electrophoretic display module and a second surface of the supporting member. The second surface faces away from the first surface.

As shown in FIG. 2 and FIG. 3, in step S1, a sputtering method may be performed to form the first anti-reflective layer 130, but the present invention is not limited in this regard. For example, the first anti-reflective layer 130 may be formed on the first surface 122 of the supporting member 120 by physical vapor deposition (PVD) and chemical vapor deposition (CVD).

Figure 4:
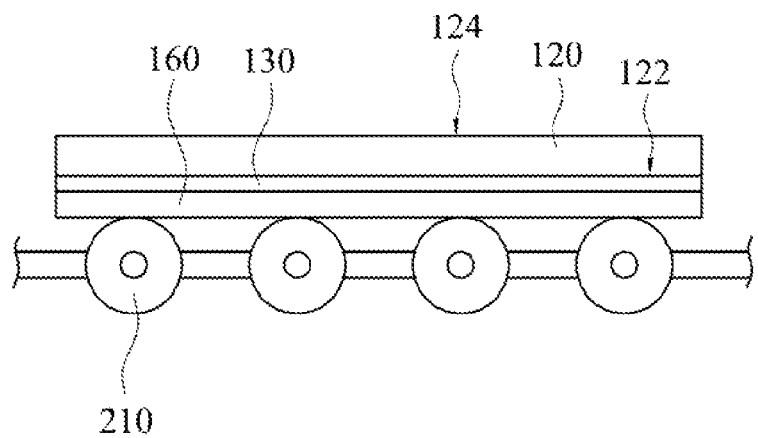
FIG. 4 is a schematic view of a supporting member placed on a roller device according to one embodiment of the present invention.

FIG. 4 is a schematic view of the supporting member 120 placed on a roller device 210 according to one embodiment of the present invention. After the first anti-reflective layer 130 is formed, a protection film 160 may be adhered on the surface of the first anti-reflective layer 130 facing away from the supporting member 120. Thereafter, the supporting member 120 is placed on the roller device 210. When the roller device 210 is in a rotation state, the roller device 210 may be in contact with the protection film 160, thereby moving the supporting member 120. The roller device 210 does not wear the first anti-reflective layer 130 due to the protection of the protection film 160. When the supporting member 120 is moved on the roller device 210, the color filter layer 140 (see FIG. 2) may be formed on the second surface 124 of the supporting member 120 by coating.

As shown in FIG. 2 and FIG. 4, after the color filter layer 140 is formed on the second surface 124 of the supporting member 120 of FIG. 4, the first adhesive layer 150 may be used to adhere the supporting member 120 that has the color filter layer 140 to the protective layer 114 of the electrophoretic display module 110. Afterwards, the protection film 160 may be torn out of the surface of the first anti-reflective layer 130. Alternatively, the protection film 160 is torn first, and thereafter the supporting member 120 having the color filter layer 140 is adhered to the electrophoretic display module 110.

It is to be noted that the connection relationships and the materials of the elements described above will not be repeated in the following description. In the following description, another reflective display device will be described.

Figure 5:
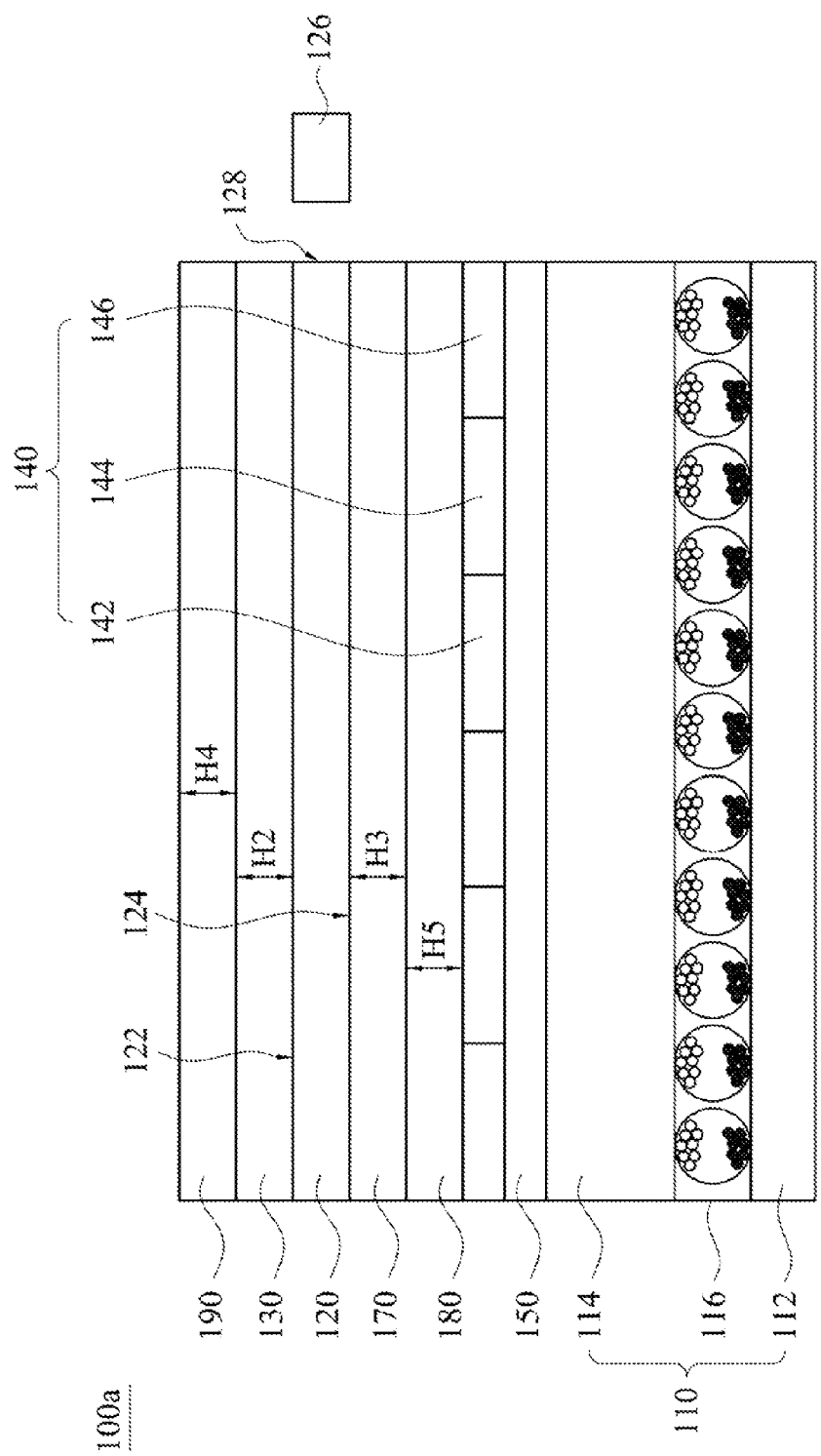
FIG. 5 is a cross-sectional view of a reflective display device according to another embodiment of the present invention, in which the position of the cut line is the same that of FIG. 2.

FIG. 5 is a cross-sectional view of a reflective display device 100a according to another embodiment of the present invention, in which the position of the cut line is the same that of FIG. 2. The reflective display device 100a includes the electrophoretic display module 110, the supporting member 120, the first anti-reflective layer 130, and the color filter layer 140. The difference between this embodiment and the embodiment shown in FIG. 2 is that the supporting member 120 is a light guide plate, and the reflective display device 100a further includes a light source 126, a second anti-reflective layer 170, a second adhesive layer 180, and a third anti-reflective layer 190. The supporting member 120 has a light incident surface 128 that is adjacent to the first and second surfaces 122, 124, and the light source 126 faces the light incident surface 128 of the supporting member 120. The supporting member 120 and the light source 126 may be referred to as the front light module of the reflective display device 100a for providing an incident light to the electrophoretic display module 110.

Moreover, the second anti-reflective layer 170 is located on the second surface 124 of the supporting member 120 and in contact with the supporting member 120. The second adhesive layer 180 is between the second anti-reflective layer 170 and the color filter layer 140. The third anti-reflective layer 190 is located on the first anti-reflective layer 130, such that the first anti-reflective layer 130 is between the third anti-reflective layer 190 and the supporting member 120.

In this embodiment, the thickness H2 of the first anti-reflective layer 130 may be 133.75 nm, and the index of refraction of the first anti-reflective layer 130 may be 1.4. The thickness H3 of the second anti-reflective layer 170 is approximately in a range of 100 nm to 180 nm, such as 133.75 nm, and the index of refraction of the second anti-reflective layer 170 may be 1.4. The thickness H4 of the third anti-reflective layer 190 is approximately in a range of 100 nm to 180 nm, such as 142.5 nm, and the index of refraction of the third anti-reflective layer 190 may be 1.22. In addition, the second adhesive layer 180 may be optical clear adhesive. The thickness H5 of the second adhesive layer 180 may be 50 μm, and the index of refraction of the second adhesive layer 180 may be 1.5. Designers may change the thickness H2 of the first anti-reflective layer 130, the thickness H3 of the second anti-reflective layer 170, and the thickness H4 of the third anti-reflective layer 190 depending on a wavelength of an incident light, thereby reducing the reflectivity of the first, second, and third anti-reflective layers 130, 170, 190 for the specific wavelength.

Moreover, the color filter layer 140 may include a red filter array 142, a green filter array 144, and a blue filter array 146. After a light reflected by the electronic ink layer 116 passes through the color filter layer 140 and other layers above the color filter layer 140, users outside the reflective display device 100a may observe a color image. In this embodiment, when the light source 126 emits light, the supporting member 120 may provide incident light to the electrophoretic display module 110, such that the reflective display device 100a may display images in an environment without sunlight or lamplight. Since the second anti-reflective layer 170 is located on the second surface 124 of the supporting member 120, the reflectivity for a downward light of the supporting member 120 may be reduced.

As shown in FIG. 3 and FIG. 5, when the reflective display device 100a is manufactured, the first anti-reflective layer 130 is formed on the first surface 122 of the supporting member 120, and the second anti-reflective layer 170 may be formed on the second surface 124 of the supporting member 120. Afterwards, the third anti-reflective layer 190 may be formed on the first anti-reflective layer 130, such that the first anti-reflective layer 130 is between the third anti-reflective layer 190 and the supporting member 120.

In this embodiment, the first adhesive layer 150 may be used to adhere the color filter layer 140 to the protective layer 114 of the electrophoretic display module 110. Thereafter, the second adhesive layer 180 may be used to adhere the second anti-reflective layer 170 to the color filter layer 140. As a result, the structure including the supporting member 120, the first anti-reflective layer 130, the second anti-reflective layer 170, and the third anti-reflective layer 190 may be adhered to the color filter layer 140.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A reflective display device, comprising:
    an electrophoretic display module comprising:
        an array substrate;
        a protective layer; and
        an electronic ink layer between the array substrate and the protective layer;
    a supporting member having a first surface, a second surface opposite to the first surface, and a sidewall adjacent to the first surface and the second surface;
    a first anti-reflective layer directly formed on the first surface of the supporting member and in contact with the supporting member, wherein a thickness of the first anti-reflective layer is ¼ the wavelength of visible light, and there is no portion of the first anti-reflective layer extending outward from the sidewall of the supporting member;
    a third anti-reflective layer formed on the first anti-reflective layer, such that the first anti-reflective layer is between the third anti-reflective layer and the supporting member;
    a color filter layer between the protective layer and the second surface of the supporting member; and
    wherein the supporting member is a light guide plate, and the supporting member has a light incident surface that is adjacent to the first and second surfaces, and the reflective display device further comprises: a light source facing the light incident surface of the supporting member.

2. The reflective display device of claim 1, further comprising:
    a first adhesive layer between the color filter layer and the protective layer.

3. The reflective display device of claim 1, further comprising:
    a second anti-reflective layer located on the second surface of the supporting member and in contact with the supporting member.

4. The reflective display device of claim 3, further comprising:
    a second adhesive layer between the second anti-reflective layer and the color filter layer.

5. The reflective display device of claim 3, wherein a thickness of the second anti-reflective layer is approximately in a range of 100 nm to 180 nm.

6. The reflective display device of claim 1, wherein a thickness of the third anti-reflective layer is approximately in a range of 100 nm to 180 nm.

7. The reflective display device of claim 1, wherein a thickness of the first anti-reflective layer is approximately in a range of 100 nm to 180 nm.

8. The reflective display device of claim 1, wherein the supporting member is a glass substrate.

* * * * *